(12) United States Patent
Perelman

(10) Patent No.: US 10,827,830 B2
(45) Date of Patent: Nov. 10, 2020

(54) METHOD OF ADJUSTING THE INCLINATION OF A FURNITURE LEG AND A MOUNTING SET

(71) Applicant: SISO A/S, Skovlunde (DK)

(72) Inventor: David Tomas Perelman, Skovlunde (DK)

(73) Assignee: SISO A/S, Skovlunde (DK)

( * ) Notice: Subject to any disclaimer, the term of this patent is extended or adjusted under 35 U.S.C. 154(b) by 0 days.

(21) Appl. No.: 15/768,136

(22) PCT Filed: May 23, 2017

(86) PCT No.: PCT/IB2017/053046
§ 371 (c)(1),
(2) Date: Apr. 13, 2018

(87) PCT Pub. No.: WO2018/215815
PCT Pub. Date: Nov. 29, 2018

(65) Prior Publication Data
US 2020/0245758 A1 Aug. 6, 2020

(51) Int. Cl.
*A47B 13/02* (2006.01)
*F16B 12/52* (2006.01)
*A47B 13/00* (2006.01)

(52) U.S. Cl.
CPC ............ *A47B 13/021* (2013.01); *F16B 12/52* (2013.01); *A47B 13/003* (2013.01);
(Continued)

(58) Field of Classification Search
CPC ................ A47B 13/021; A47B 13/003; A47B 2013/022; A47B 9/16
(Continued)

(56) References Cited

U.S. PATENT DOCUMENTS 2,879,086 A 3/1959 Perry
2,905,422 A * 9/1959 Sacharow ............... F16B 12/48
248/188
(Continued)

FOREIGN PATENT DOCUMENTS

DE 200 02 201 U1 4/2000
DE 199 36 126 A1 2/2001

OTHER PUBLICATIONS

International Search Report (PCT/ISA/210) issued in PCT/IB2017/053046, dated Jul. 28, 2017.
(Continued)

*Primary Examiner* — Bradley Duckworth
(74) *Attorney, Agent, or Firm* — Birch, Stewart, Kolasch & Birch, LLP

(57) ABSTRACT

A method of adjusting the inclination of a furniture leg and a mounting set including a base part, a mounting part, a fixation means, and a furniture leg. The base part comprises a first truncated cone element with an inclined surface. The mounting part includes a second truncated cone element having an inclined surface with a connecting element for detachable connection of the furniture leg. The fixation means prevents rotational movement between the base part and the mounting part. The mounting part is detachably fixated to the base part for allowing the mounting part to be rotated relative to the base part for adjusting the inclination angle of the furniture leg relative to the vertical plane being perpendicular to the planar underside of the furniture.

20 Claims, 5 Drawing Sheets

(52) U.S. Cl.
CPC ... *A47B 2013/022* (2013.01); *A47B 2200/002* (2013.01); *A47B 2200/0084* (2013.01)

(58) Field of Classification Search
USPC ........................................................ 248/188
See application file for complete search history.

(56) References Cited

U.S. PATENT DOCUMENTS

| | | | |
|---|---|---|---|
| 3,179,365 A | 4/1965 | Holtz | |
| 3,516,633 A * | 6/1970 | Blackwood | F16B 12/44 |
| | | | 248/188 |
| 4,603,526 A | 8/1986 | Bollmann | |
| 9,713,376 B2 * | 7/2017 | Christian | A47B 13/081 |
| 9,726,209 B2 * | 8/2017 | Moller Hansen | A47B 13/021 |
| 9,980,560 B2 * | 5/2018 | Christian | A47B 13/003 |
| 2006/0255227 A1 | 11/2006 | Rand et al. | |
| 2008/0222973 A1 | 9/2008 | Lee et al. | |
| 2020/0000217 A1 * | 1/2020 | Kojima | F16B 9/02 |
| 2020/0003243 A1 * | 1/2020 | Perelman | A47B 9/18 |

OTHER PUBLICATIONS

Written Opinion (PCT/ISA/237) issued in PCT/IB2017/053046, dated Jul. 28, 2017.

* cited by examiner

METHOD OF ADJUSTING THE INCLINATION OF A FURNITURE LEG AND A MOUNTING SET

TECHNICAL FIELD

The present invention relates to a mounting set for a furniture, such as a table.

BACKGROUND OF THE INVENTION

It has been known to use mounting brackets for connecting a furniture leg to a furniture. Various kinds of leg mounting brackets for furniture are known in the art, among which are mounting brackets for mounting furniture legs in a position which is not perpendicular to the furniture itself or the surface onto which the furniture is to be placed.

In U.S. Pat. No. 3,516,633 a furniture leg mount is disclosed. The leg mount includes a T-nut having a head disposed on one side of a furniture support member and projecting at a predetermined angle toward the opposite surface of the member. A circular leg-supporting wedge has one face lying flatly against said opposite surface of the support member, and the opposite face of the wedge is parallel to the upper end of the leg. A leg on the wedge is received in a depression in the member to prevent rotation of the wedge when the leg is tightened towards the member. This wedge-formed bracket enables the leg to be placed at an angle that is not right with respect to the furniture.

The disadvantage of this design is that the inclination of the furniture leg is fixed as the angle is defined by the shape of the wedge. Another disadvantage of this design is that it would be necessary to drill a hole in the table top to accommodate the T-nut, which makes the mounting of the bracket rather complicated and would likewise disrupt the top surface of the table top.

An another example can be found in EP 2 964 055 (A1), which discloses a jointing for a furniture leg element comprising a base part configured to be attached to a furniture, threaded aperture, a sliding element and an elongated threaded top part configured to be fixed to the leg element. The base part comprises a convex outer surface, which during use faces the leg element, and which outer surface further comprises an elongated hole defining a longitudinal extension and a transversal extension. The elongated threaded top part has a cross-sectional dimension, and the sliding element is configured to slide along the inner side of the convex outer surface of the base part. A threaded aperture is configured for cooperating with the threaded top part in such a way that the leg element is fixed to the base part by screwing the top part in the sliding element, and thereby enabling the leg element to be fixed at a certain angle relative to the furniture.

One of the disadvantages of this solution is that the jointing for a furniture leg only allows for adjustment of the inclination of the furniture leg in a single plane. The single plane is defined by the elongated hole in the base part and the restricted movement of the sliding element along the inner side of the convex outer surface of the base part.

The general object of the present invention is to provide a versatile mounting set for adjusting the inclination angle of a furniture leg in several planes.

In accordance with a first aspect, the present invention provides a mounting set for a furniture, such as a table, said mounting set comprising a base part, a mounting part, a fixation means, and a furniture leg, the base part comprising a first truncated cone element having an inclined surface and being intended for fastening to a planar underside of the furniture, the mounting part comprising a second truncated cone element having an inclined surface with a connecting element and being fastened to the base part, the fixation means being provided for preventing rotational movement between the base part and the mounting part and for releasable connecting the mounting part to the base part, the furniture leg being intended for detachable fixation to the connecting element of the base part and having a cylindrical part and an elongated threaded element connected to one end of the cylindrical part, the inclined surface first and second truncated cone elements being complimentary with one another, the mounting part being detachable fixated to the base part for allowing the mounting part to be rotated relative to the base part for adjusting the inclination angle of the furniture leg relative to the vertical plane being perpendicular to the planar underside of the furniture (1').

Through the use of two truncated cone elements, it is possible to adjust the inclination angle of the furniture leg in several planes. The first truncated cone element being connected to the underside of a furniture and constituting the base part, and the second truncated cone element being connected to the first truncated cone element in detachable manner, enabling the second truncated cone element to rotate relative to the first truncated cone element.

The inclination angle of the furniture leg is defined by the inclination of the inclined surface of the first truncated cone element. The inclination angle of the inclined surface of the second truncated cone element is identical to the inclination of the inclined surface of the first truncated cone element. By using two truncated cone elements having the same inclination, it is possible to adjust the furniture legs in several position.

By having a first truncated cone element with an inclined surface and second truncated cone element with an inclined surface being complimentary with one another, the mounting part can be rotated relative to the base part, whereby the inclination of the furniture leg can be adjusted between an angled position being defined by the inclination of the inclined surface of the first truncated cone element and neutral position, where the furniture leg is positioned perpendicular to the mounting surface of the furniture as the two truncated cone elements have the same inclination, whereby the inclination of the first truncated cone element is compensated by the inclination of the second truncated cone element.

Each of the truncated cone elements has an inclined surface forming an angle greater than 0 degrees relative to the base surface of truncated cone element The term "cone" should in this context be understood as a geometric shape that tapers smoothly from a flat base to a point called the apex or vertex. The base is not restricted to be a circle, but can be any one-dimensional quadratic form in the plane.

The term "truncated cone" should in this context be understood as a cone which is cut off between the base and the parallel plane of the cone. The base is not restricted to be a circle, but can be any one-dimensional quadratic form in the plane. The base may be any one-dimensional shape such as rectangle, square, oval or elliptic.

The term "inclined surface" should in this context be understood as a surface inclined to the base when a cone is cute by a plane inclined to base of the cone forming a wedge-formed surface.

The base part may have a first base surface being convex, and the inclined second mounting part surface may be concave.

Alternatively, the base part having a first base surface being concave and said inclined second mounting part surface being convex.

The furniture leg may have a planar and a circular abutment surface, and the second mounting part surface may be circular and have a diameter being identical the diameter of the abutment surface of the furniture leg.

The furniture leg may have a planar and a circular abutment surface and the second mounting part surface of the mounting part being circular and having a diameter greater than the diameter of the circular abutment surface.

According to the present invention, the base part may have a first base surface and a second base surface being planar, where the base sidewall extends between the first base surface to the second base surface, the second base surface being tapered, and the first base surface forming an angle greater than 5 degrees relative to the second base surface.

According to the present invention, the mounting part has a planar second mounting part surface and a tapered sidewall extending from the second mounting part surface to the first mounting part surface and the first mounting part surface forming an angle greater than 0 degree relative to said second mounting part surface.

According to the present invention, the base part and the mounting part have apertures arranged along the circumference for inserting the fixation means through the aperture of the base part and the mounting part.

According to the present invention, the first mounting part surface forms an angle of 0 degree to 30 degrees with said second base surface when said base part and mounting part are coupled to one another.

According to the present invention, the mounting part has a connecting element arranged in the center of the mounting part.

According to the present invention, the base part has an aperture arranged in the center of the base part for allowing the cylindrical element to be accommodated.

DETAILED DESCRIPTION

A further understanding of the nature and advantages of the present invention may be realized by reference to the remaining portions of the specification and the drawings. In the following, preferred embodiments of the invention are explained in more detail with reference to the drawings, wherein.

Figure 1:
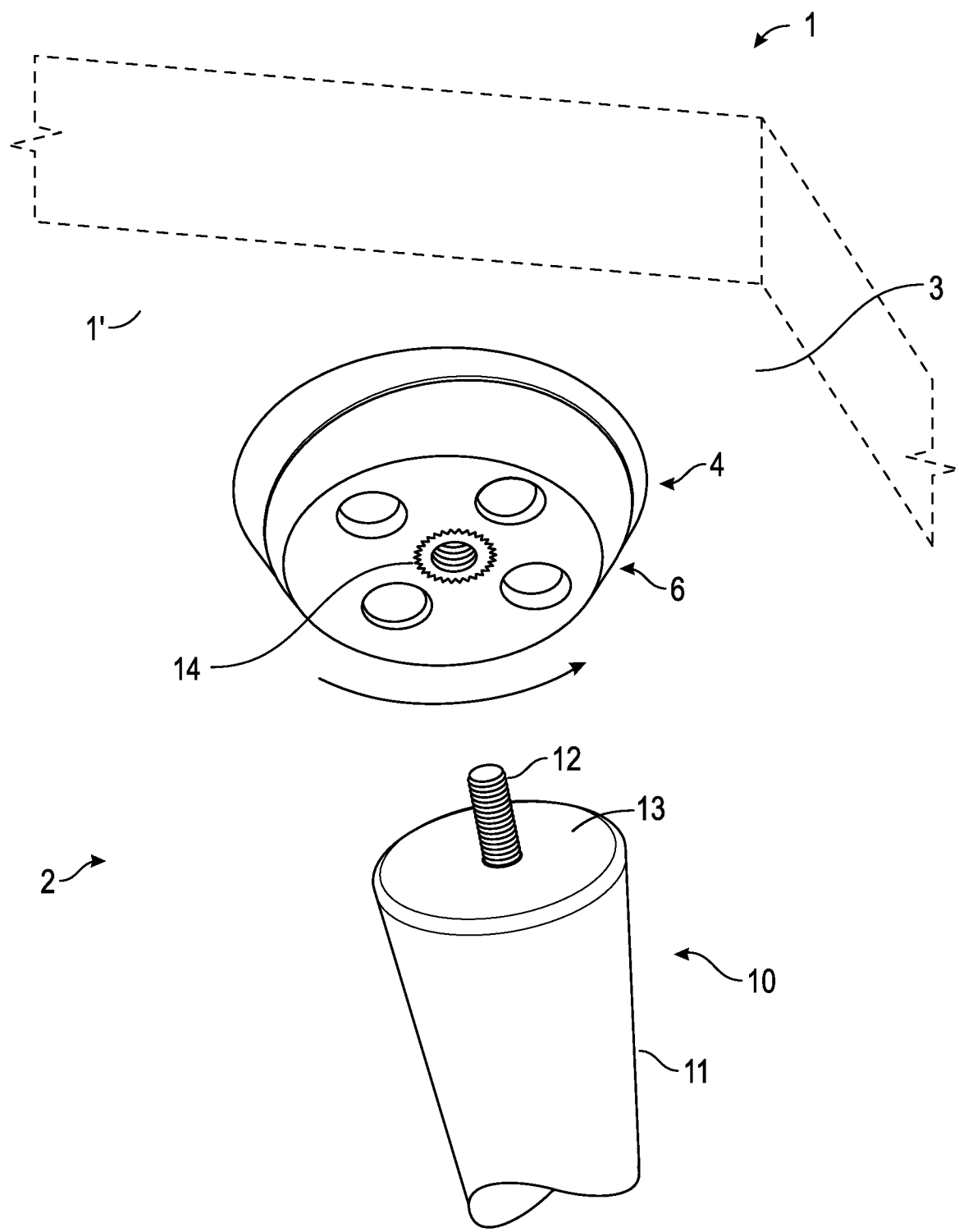
FIG. 1 is an overall schematic view of a presently preferred embodiment of the mounting set for a furniture.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

FIG. 1 shows the mounting set 2 comprising a base part 4, a mounting part 6, a fixation element 8, and a furniture leg 10. The base part 4 is intended for fastening to the underside 1' of said furniture 1, preferably by using a number of fastening elements, such as screws. The furniture could be a table, desk, or the like, which would have a substantial planar top supported by a number of legs 10, which would be connected to the substantial planar top by using the base part 4 and the mounting part 6.

The mounting part 6 is configured to be coupled to the base part 4 in a manner enabling rotation of the mounting part 6 relative to the base part 4. The furniture leg 10 includes a cylindrical part 11 and an elongated threaded element 12 connected to one end of the cylindrical part 11.

FIG. 1 shows an embodiment where the furniture leg 10 has a planar and a circular abutment surface 13, the abutment surface 13 being substantially planar, and the surface of the mounting part being circular and having a diameter being identical to the diameter of the circular abutment surface 13 of the furniture leg.

In an embodiment of the present invention not shown, the furniture leg has a planar circular abutment surface having a diameter greater than the diameter of the circular abutment surface of said second mounting part surface of the mounting part.

Figure 2:
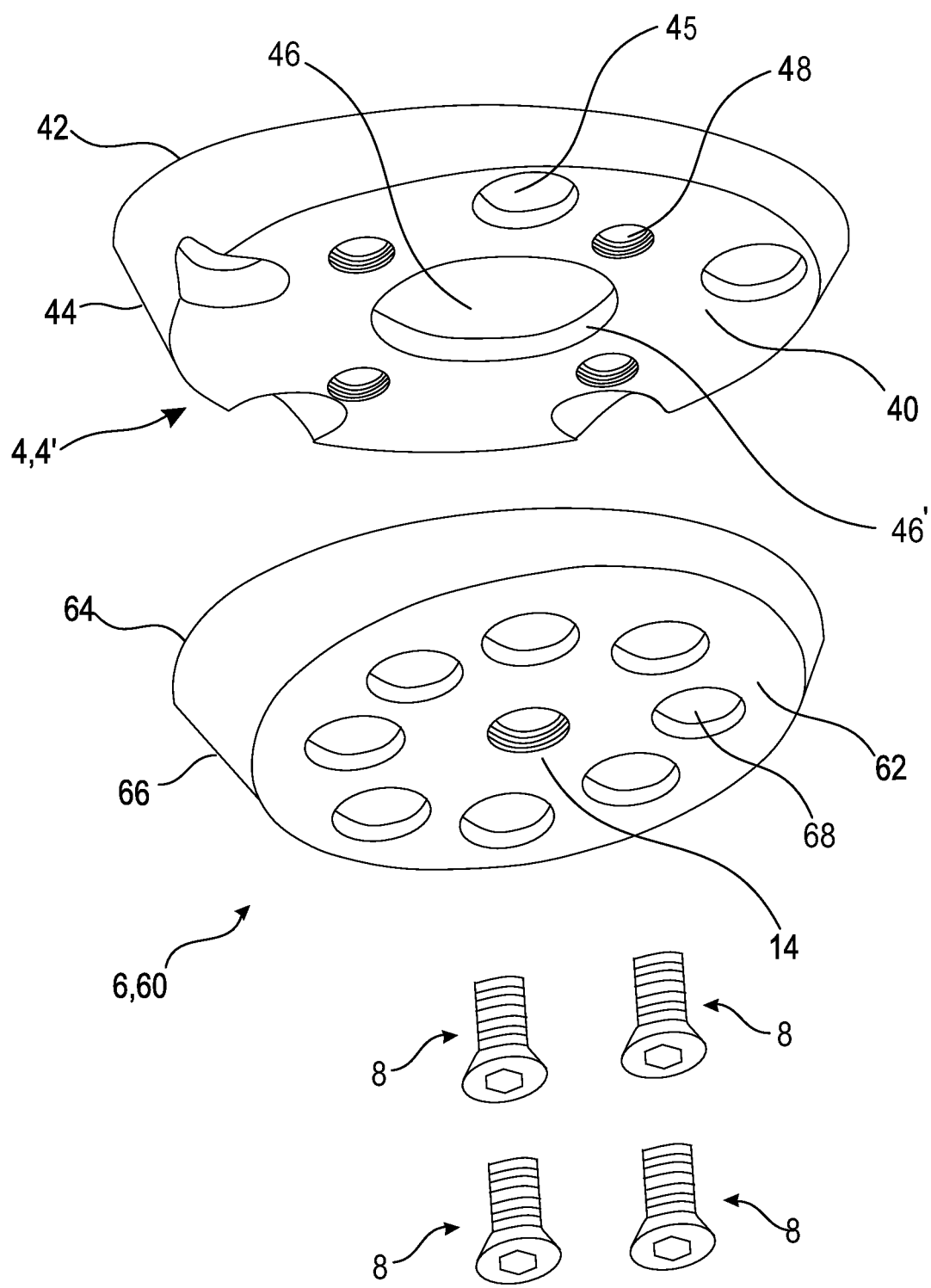
FIG. 2 shows an overview of the mounting part and the base part according to the invention.

FIG. 2 shows the base part 4, a mounting part 6, and the fixation means in the form of four fixation screws 8. The base part 4 is configured to be fastened to the underside of a furniture (not shown in FIG. 2), and the base part 4 comprises a first truncated cone element 4'. The truncated cone element 4' of the base part 4 has a first base surface 40, a second base surface 42, and a base sidewall 44 extending from the first base surface 40 to the second base surface 42.

The base part 4 further comprises fasting means 45, which are used for fastening the base part 4 to the underside 1' of said furniture. The base part 4 further comprises an aperture 46 arranged in the center of the base part 4 for allowing an elongated threaded element to enter into the center of the base part 4.

The base part 4 is provided with threaded apertures 48 arranged along the circumference of the base part 4, and the threaded apertures 48 are used for interconnecting the base part and said mounting part.

FIG. 2 shows a presently preferred embodiment of the mounting part 6, the mounting part 6 comprising a second truncated cone element 60 having an inclined surface with a connecting element 14 with a protruding hole, where the protruding hole would be threaded for allowing the furniture leg 10 to be fixated to the mounting part 6 in a detachable manner.

The second truncated cone element 60 has a first mounting part surface 62, a second mounting part surface 64, and a mounting part sidewall 64 extending from the first mounting part surface 62 to the second mounting part surface 64.

FIG. 2 shows an abutting surface 62 of the mounting part 6 being circular, and the abutting surface 62 has a diameter which is identical to the diameter of the circular abutment surface 13 of the furniture leg 10 (not shown). It is however possible to have a furniture leg 10 having an abutment surface being identical to the shape of the abutment surface of the furniture legs, e.g. having the same geometrical shape and being rectangular.

The base part 4 has a geometry being complimentary with the geometry of the mounting part 6, and according to a first aspect of a preferred embodiment, the base part has a first base surface 40 being complimentary with the inclined second mounting part surface 64 of the mounting part 6.

According to a further embodiment (not shown), the base part 4 has a first base surface 40 being convex, and the second mounting part surface 64 of the mounting part 4 being concave.

According to a further embodiment (not shown), the base part 4 has a first base surface being concave, and the inclined second mounting part surface 64 has a convex surface.

The elongated threaded element 12 of said furniture legs 10 is inserted through the aperture 14 of the mounting part 6 and through the apertures 46 of the base part 4.

Figure 3:
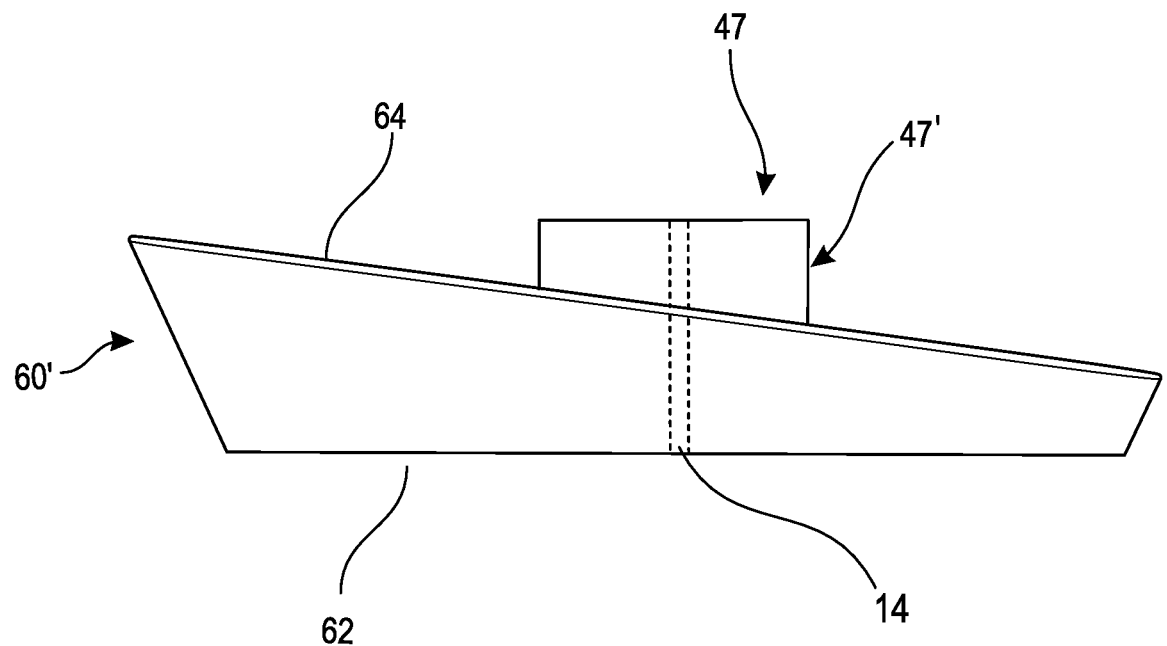
FIG. 3 is a side view of the mounting part.

FIG. 3 shows the mounting part 61 according to a further embodiment of the present invention, where the mounting part 61 comprises a second truncated cone element 60' having an inclined surface and a threaded connecting hole 14' for allowing a furniture leg to be fixated to the mounting part 6 in a detachable manner.

The mounting part 6' further comprises a cylindrical element 47 protruding from the inclined second mounting part surface 64, and the cylindrical element 47 has a diameter which allows the cylindrical element 47 to extend and be guided by the sidewall 46' of the aperture 46 of the base part 4.

The cylindrical element 47 provides support for the mounting part 6' during rotation of the mounting part 6' relative to the base part 4. The cylindrical element 47 furthermore provides enhanced guidance and fixation for the furniture leg as the length of the threaded hole of the connection element is enlarged, which is advantageous during adjustment of the inclination angle of the furniture leg relative to the mounting surface of the furniture 3.

The sidewall 47' of the cylindrical element 47 and the diameter of the cylindrical element 47 are adapted to match the diameter of the inner aperture 46 of the base part 4, meaning that the diameter of the cylindrical element 47 is substantially equal to the diameter of the inner aperture 46.

Figure 4:
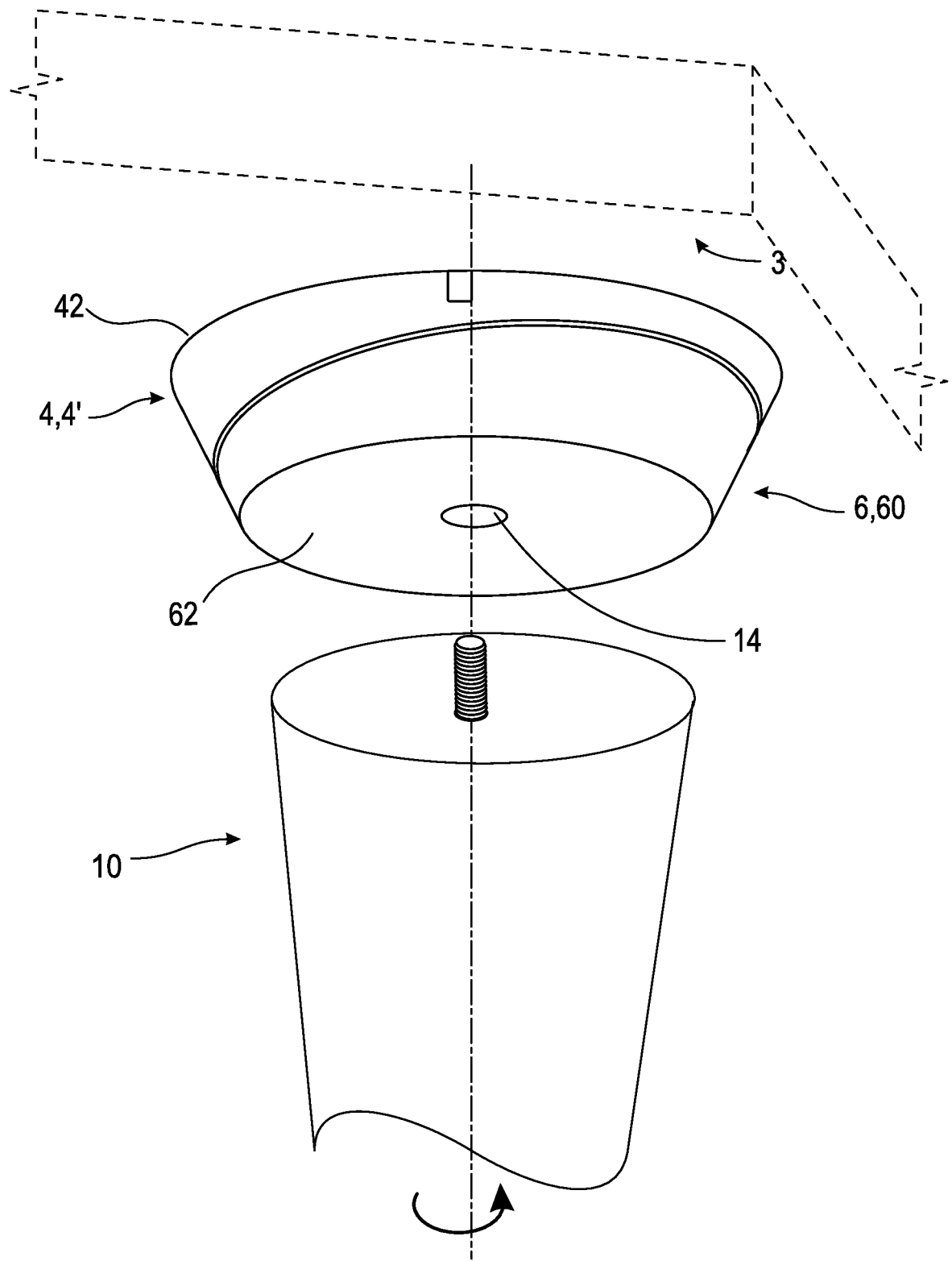
FIG. 4 shows a mounting set in a position where the mounting part is rotated into a position where the furniture leg is positioned in a position perpendicular to the mounting surface of the furniture.

FIG. 4 shows a mounting set (2) in a position where the mounting part is rotated into a position where the furniture leg is positioned in a position perpendicular to the mounting surface of the furniture. The furniture leg 10 has a planar and a circular abutment surface 13 connected to the connecting element in the center of the base part.

The mounting part 6 is detachable fixated to the base part 4 for allowing the mounting part 6 to be rotated into a position where the inclination angle of the furniture leg 10 relative to the vertical plane 7 is zero and being perpendicular to the second base surface 42 of the base part 4.

Figure 5:
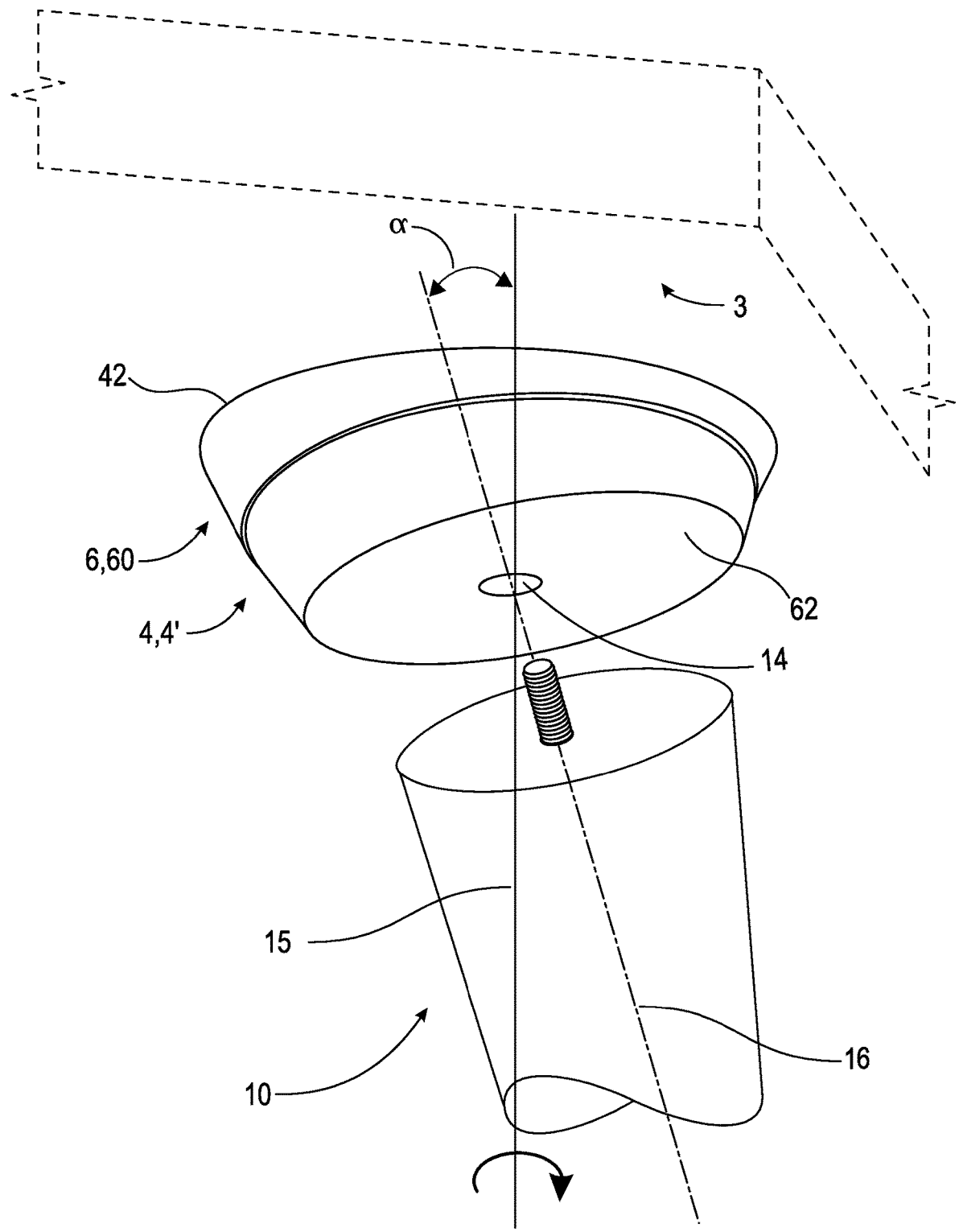
FIG. 5 shows a mounting set in a position where the mounting part is rotated into a position where the furniture leg is angled relative to the mounting surface of the furniture.

FIG. 5 shows a mounting set in a position where the mounting part is rotated into a position where the furniture leg is angled relative to the mounting surface of the furniture. The furniture leg 10 has a planar and a circular abutment surface 13 connected to the connecting element in the center of the base part.

The mounting part 6 is detachably fixated to the base part 4 for allowing the mounting part 6 to be rotated relative to the base part 4 for adjusting the inclination angle of the furniture leg 10 relative to the vertical plane being perpendicular to the second base surface 42 of the base part 4, the base part (4) and the mounting part (6) having apertures arranged along the circumference for inserting the fixation means (8) through the aperture (48,68) of said base part (4) and said mounting part (6). The threaded apertures 48 can be arranged along the circumference of the base part 4, and the threaded apertures 48 are used for interconnecting the base part and said mounting part. It is however possible to one or several screws to obtain a detachable fixation of the base part 4 relative to the mounting part 6.

In the FIGS. 2-5, the base part 4 has a first base surface 40 and a second base surface 42 being planar, and the first base surface 40 has an angle being 10 degrees relative to the second base surface 42.

In the FIGS. 2-5, the mounting part 6 has a planar second mounting part surface 64 and a tapered sidewall 66 extending from the second mounting part surface 64 to the first mounting part surface 62 at an angle of 25 degrees. The first mounting part surface 62 has an angle of 10 degrees relative to the second mounting part surface 64.

In all of the figures, the inclined surface 62 of the mounting part 6 is identical to the first mounting part surface 62, and the inclined surface of the base part 4 is identical to the first base surface 40. Furthermore, the first base surface 40 has a geometrical shape corresponding to the second mounting part surface 64.

The first truncated cone element 4' and the second truncated cone element 60, 60' are complimentary with one another. The mounting part 6 is rotated relative to the base part 4, whereby the inclination of the furniture leg 10 is adjusted into an angled position being defined by the inclination of the inclined surface of the first truncated cone element 6, 60'.

In FIG. 4-5, the mounting part 6 is detachably fixated to the base part 4 for allowing the mounting part 6 to be rotated relative to the base part 4 for adjusting the inclination angle (α) of the furniture leg 10 relative to the vertical plane being perpendicular to the second base surface 42 of the base part 4.

By rotation of the mounting part 6 relative to the base part 4 around the rotation axis 15, the inclined first mounting part surface 62 of the second truncated cone element 60' will be angled relative to the mounting surface of the furniture 3, and furniture leg 10 would also be angled relative to the mounting surface of the furniture 3.

In FIG. 5 the mounting part 6 is rotated 180 degrees relative to the base part 4 around the rotation axis 15. In FIG. 5, the furniture leg would have an inclination angle of 10 degrees, being defined as the angle between the first mounting part surface 62 of the second truncated cone element 60' and the mounting surface of the furniture 3. The mounting part 6 can be rotated 360 degrees relative to the base part 4.

The inclination angle (α) of the furniture leg 10 relative to the rotational axis 15 is shown in FIG. 5 as the angle between the center line of the furniture leg 16 and the rotational axis 15.

REFERENCE NUMBERS

In the following is given a list of reference numbers that are used in the detailed description of the invention.
1 furniture
1' underside of the furniture
3 mounting surface of the furniture
(α) inclination angle
2 mounting set
4 base part 4' first truncated cone element
6, 61 mounting part
8 fixation means
10 furniture leg
11 cylindrical part
12 an elongated threaded element
13 abutment surface
14 connecting element
15 rotation axis
16 center line of the furniture leg
40 first base surface
42 second base surface
44 base sidewall
45 fasting means
46 aperture
46' aperture sidewall
47 cylindrical element
47' sidewall of the cylindrical element
48 threaded apertures
60 60' second truncated cone element
62 first mounting part surface
64 second mounting part surface
66 mounting part sidewall
68 aperture

The invention claimed is:

1. A mounting set for connecting a furniture leg to a furniture, said mounting set comprising a base part, a mounting part, a fixation means, and a furniture leg,
the base part comprising a first truncated cone element having an inclined base surface and being intended for fastening to a planar underside of the furniture,
the mounting part comprising a second truncated cone element having an inclined mounting part surface with a connecting element for the furniture leg and being intended for connecting to the base part,
the fixation means being provided for preventing rotational movement between the base part and the mounting part and for releasable connecting the mounting part to the base part,
the furniture leg being intended for detachable fixation to the connecting element of the base part,
the inclined surface of the first and the second truncated cone element being complimentary with one another, and
the mounting part being detachable fixated to the base part for allowing the mounting part to be rotated relative to the base part for adjusting the inclination angle of the furniture leg relative to the vertical plane being perpendicular to the planar underside of the furniture.

2. The mounting set according to claim 1, wherein said inclined base surface of said base part being convex and the inclined mounting part surface being concave.

3. The mounting set according to claim 2, wherein the furniture leg having a planar and a circular abutment surface and the mounting part having a mounting part surface being circular and having a diameter being identical the diameter of the abutment surface of the furniture leg.

4. The mounting set according to claim 2, wherein said furniture leg having a planar and a circular abutment surface and the mounting part having a mounting part surface of the mounting part being circular and having a diameter greater than the diameter of the circular abutment surface.

5. The mounting set according to claim 2, wherein the mounting part having a planar mounting part surface and a tapered sidewall extending from the planar mounting part surface to the inclined mounting part surface, said inclined mounting part surface forming an angle greater than 0 degrees relative to said planar mounting part surface.

6. The mounting set according to claim 1, wherein said inclined base surface of said base part being concave and said inclined mounting part surface being convex.

7. The mounting set according to claim 6, wherein the furniture leg having a planar and a circular abutment surface and the mounting part having a mounting part surface being circular and having a diameter being identical the diameter of the abutment surface of the furniture leg.

8. The mounting set according to claim 6, wherein said furniture leg having a planar and a circular abutment surface and the mounting part having a mounting part surface of the mounting part being circular and having a diameter greater than the diameter of the circular abutment surface.

9. The mounting set according to claim 6, wherein the mounting part having a planar mounting part surface and a tapered sidewall extending from the planar mounting part surface to the inclined mounting part surface, said inclined mounting part surface forming an angle greater than 0 degrees relative to said planar mounting part surface.

10. The mounting set according to claim 1, wherein the furniture leg having a planar and circular abutment surface and the mounting part having a mounting part surface being circular and having a diameter being identical to the diameter of the abutment surface of the furniture leg.

11. The mounting set according to claim 1, wherein said furniture leg having a planar and circular abutment surface and the mounting part having a mounting part surface being circular and having a diameter greater than the diameter of the circular abutment surface.

12. The mounting set according to claim 1, wherein the base part having an inclined base surface and a base surface being planar, and a base sidewall where the base sidewall extends between the inclined base surface to the planar base surface, the planar base surface being tapered, said inclined base surface forming an angle greater than 5 degrees relative to said planar base surface.

13. The mounting set according to claim 1, wherein the mounting part having a planar second mounting part surface and a tapered sidewall extending from the second mounting part surface to the inclined mounting part surface, said inclined mounting part surface forming an angle greater than 0 degrees relative to said second mounting part surface.

14. The mounting set according claim 1, wherein the base part and the mounting part having apertures arranged along the circumference for inserting the fixation means through the apertures of said base part and said mounting part.

15. The mounting set according claim 1, wherein said inclined mounting part surface forms an angle of 0 degrees to 30 degrees with a base surface of said base part when said base part and the mounting part are coupled to one another.

16. The mounting set according claim 1, wherein the connecting element of the mounting part being arranged in the center of the mounting part.

17. The mounting set according claim 1, wherein the base part having an aperture arranged in the center of the base part.

18. The mounting set according to claim 1, wherein said furniture leg having a planar and a circular abutment surface and the mounting part having a mounting part surface of the mounting part being circular and having a diameter greater than the diameter of the circular abutment surface.

19. A method of adjusting the inclination of a furniture leg using a mounting set comprising a base part, a mounting part, a fixation means and a furniture leg, said method comprising:

providing a base part comprising a first truncated cone element having an inclined surface, providing a mounting part comprising a second truncated cone element having an inclined surface with a connecting element, providing fixation means, providing a furniture leg, fastening the base part to a planar underside of the furniture, connecting the mounting part to the base part, fixating the furniture leg to the connecting element of the base part, rotating the mounting part relative to the base part for adjusting the inclination angle of the furniture leg relative to the vertical plane being perpendicular to the planar underside of the furniture, and fixating the fixation means for preventing rotational movement between the base part and the mounting part.

20. A method of adjusting the inclination of a furniture leg using a mounting set comprising a base part, a mounting part, a fixation means and a furniture leg, said method comprising:

providing a base part comprising a first truncated cone element having an inclined surface, providing a mounting part comprising a second truncated cone element having an inclined surface with a connecting element, providing fixation means, providing a furniture leg, fastening the base part to the underside of the furniture, connecting the mounting part to the base part, fixating the furniture leg to the connecting element of the base part, rotating the mounting part relative to the base part into a position being perpendicular to the planar underside of the furniture, and fixating the fixation means for preventing rotational movement between the base part and the mounting part.

* * * * *